Sept. 25, 1962
E. K. ARNETT
3,055,826
FRACTIONATION OF LIGHT HYDROCARBONS
Filed May 4, 1959
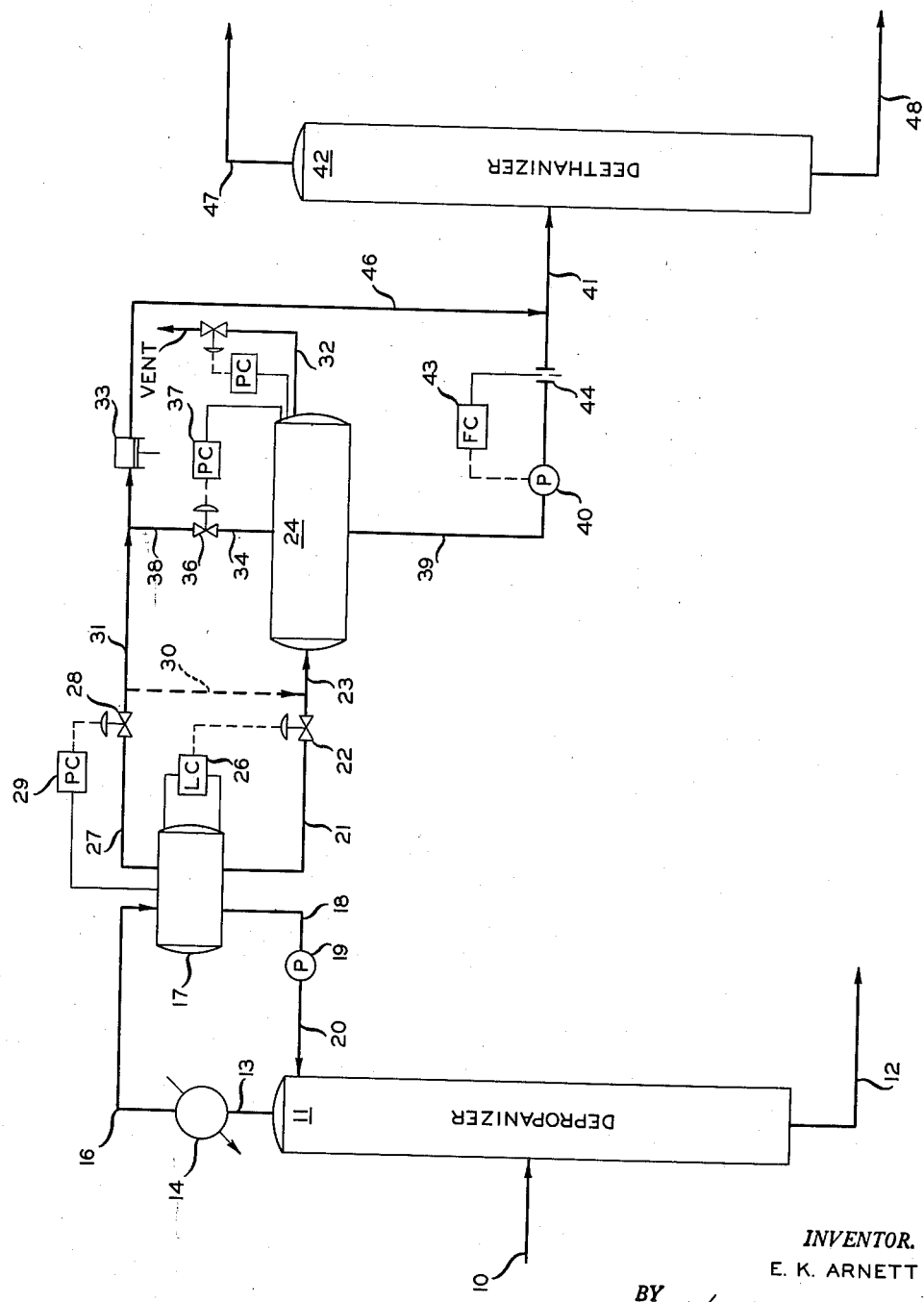
INVENTOR.
E. K. ARNETT
BY
ATTORNEYS United States Patent Office 3,055,826
Patented Sept. 25, 1962

3,055,826
FRACTIONATION OF LIGHT HYDROCARBONS
Earl K. Arnett, Oklahoma City, Okla., assignor to Phillips Petroleum Company, a corporation of Delaware
Filed May 4, 1959, Ser. No. 810,813
2 Claims. (Cl. 208—351)

This invention relates to the fractionation of liquid mixtures containing normally gaseous components. In another aspect it relates to a process for fractionating a mixture of light hydrocarbons. In one of its more specific aspects it relates to a method of transferring the overhead product from the depropanizer to a deethanizer in a fractionation of natural gasoline.

Raw natural gasoline contains a considerable amount of light components such as ethane and propane which must be removed by fractionation. The raw natural gasoline can first be fractionated in a depropanizing column, taking off a bottoms product in the gasoline boiling range. The overhead product contains predominantly propane and ethane with a small amount of methane and still smaller amounts of iso- and normal butanes. The overhead product is condensed and the condensate accumulated at substantially the same pressure in the depropanizing column. A portion of the condensate is employed as reflux and the remainder together with the vapors from the accumulator are passed to a deethanizing column. Both the depropanizing and deethanizing columns are operated at elevated pressure, for example, about 300 to 400 p.s.i.g.

Positioned between these columns is commonly a surge tank or feed vessel for the deethanizing column into which the condensate-vapor mixture from the depropanizer overhead accumulator passes on its way to the ethanizing column. Since large pressure vessels are quite expensive, it is frequently more economical to employ a surge tank which is not built to withstand the high pressures of the fractionating columns. The use of such a surge tank necessitates a pressure reduction on the depropanizer overhead and a subsequent recompression of the vapors formed to the pressure of the deethanizing column. Even so the additional recompression costs are generally insufficient to justify the use of a high-pressure vessel for the deethanizer feed tank.

When the depropanizer overhead is passed into such a storage vessel at a reduced pressure there is naturally a formation of vapor, the amount thereof depending upon the make-up of the raw natural gasoline which is fed to the depropanizing column. In an installation of this type it was found that the limiting factor on the capacity of the fractionation system was the compressor used to recompress the vapors from the feed accumulator to the pressure of the deethanizing column. With certain natural gasoline feedstocks containing relatively high amounts of propane and ethane the overall throughput had to be reduced or vapor vented because the compressor was originally sized to handle considerably smaller amounts of vapor. The installation of additional compressor capacity is one solution to the problem but because of the high initial cost of compressors, this solution is to be avoided if possible.

According to my invention, for any given set of conditions in a system wherein a mixture of materials such as light hydrocarbons are fractionated at elevated pressure in two columns in series on the overhead stream from the first column with an intermediate pressure reduction in a feed storage tank for the second fractionator, the total amount of vapor formed as a result of said pressure reduction can be substantially reduced by separating vapor from the condensate of the overhead of the first fractionating column at a higher pressure than the pressure in said storage tank. My invention can be practiced by withdrawing vapor from the overhead accumulator of the first fractionating column and keeping this vapor separate from the condensate until it is recompressed to the pressure of the second column. Even though this accumulator vapor is combined with the vapor formed in the storage tank so that the compressor operates with the same compression ratio, less total vapor is formed by operating according to my invention than is formed when all of the vapor is permitted to separate from the condensate in the storage tank.

It is an object of my invention to provide an improved method for fractionating a liquid mixture containing normally gaseous components such as a mixture of light hydrocarbon. Another object is to provide a method for transferring the overhead of a natural gasoline depropanizer to a deethanizer where an intermediate pressure reduction is necessary. Still another object is to increase the overall capacity of such a system by reducing the amount of vapor formed during the necessary pressure let-down between the depropanizer and the deethanizer and thereby reduce the overall load on the compressor employed to recompress the vapor back to the pressure of the deethanizer. Other objects and advantages and features of my invention will be apparent to those skilled in the art from the following discussion and drawing which shows schematically a flow diagram of the process operating according to my invention.

While my invention is directed primarily to fractionation of natural gasoline, it can be applied advantageously to fractionation of any mixture which contains similar light hydrocarbons. The invention can also be applied to non-hydrocarbon systems that contain light gases, i.e., gases that can be liquefied by pressure and/or refrigeration. Examples of such systems are the constituents of air, natural gas containing helium and argon, or a mixture of oxygenated compounds such as ethyl alcohol, diethyl ether, and carbon dioxide. The operation of my invention and the advantages realized thereby over prior methods of operation can best be understood by reference to the drawing.

Raw natural gasoline is fed through line 10 to fractionating column 11 operating at an elevated pressure of about 300 to 325 p.s.i.g. A bottoms product of gasoline boiling range liquids is withdrawn through line 12 while vapor overhead product of propane and ethane and a small amount of methane and butanes is withdrawn through line 13 and passed to condenser 14. The condensed product which is a mixture of vapor and condensate is passed through line 16 to accumulator 17 where the vapor and liquid are permitted to separate.

A portion of the condensate is passed through line 18 by pump 19 and then through line 20 returning as reflux to the fractionating column 11. The remainder of the condensate is withdrawn from accumulator 17 through line 21 and passed through control valve 22 and line 23 to storage vessel 24. Vessel 24 is maintained at a pressure considerably below that of the depropanizing column, for example about 200 to 275 p.s.i.g. The flow through lines 21 and 23 is controlled by motor valve 22 in response to a signal from liquid level controller 26 connected to accumulator 17 and motor valve 22.

The overhead vapors from accumulator 17 pass through line 27 at a rate controlled by valve 28 which is operatively connected to pressure controller 29 sensing the pressure in accumulator 17. The vapors leave accumulator 17 at a rate which will establish the desired pressure in the accumulator and hence in the fractionating column 11.

According to the system employed, prior to my invention, these vapors were combined with the liquid condensate in line 23, passing through conduit 30, shown as a dotted line so that it will not be confused with the system of my invention. It should be appreciated that in most installations of this type, line 23 is a much longer conduit by comparison than is shown in the drawing. Storage vessel 24 is likely to be situated at a considerable distance from the depropanizer 11. Combining the vapor and condensate from accumulator 17 is common practice, therefore, to save conduit between the accumulator 17 and storage tank 24.

Operating according to my invention the vapor removed from the condensate in accumulator 17 and passed through line 27 and valve 28 is not recombined with the condensate in line 23 but is kept separate and passed through line 31 to line 38 and thence to compressor 33. Vapor separated from the liquid in vessel 24 is removed overhead through line 34 and is passed through valve 36 to line 38 where it is combined with the vapor from the accumulator 17 and passed to compressor 33. Pressure in storage vessel 24 is maintained by controlling this released vapor through line 34 by motor valve 36 operatively connected to pressure controller 37 sensing the pressure in storage tank 24. All of the vapor, therefore, is passed through compressor 33 and any vapors generated which cannot be handled by the compressor must be vented through pressure relief line 32. Thus if the pressure in tank 24 tends to increase when valve 36 is wide open and compressor 33 is operating at capacity, the excess vapors are vented through line 32.

The liquid condensate is removed from vessel 24 and passed through line 39 by pump 40 and then through line 41 to deethanizing column 42. Flow through line 39 is controlled by flow controller 43 operatively connected to pump 40 and orifice 44 in line 39. Compressed vapors from compressor 33 are passed through line 46 and are combined with condensate in line 41. The mixture is then passed to deethanizer 42. The compressed vapor can be maintained separate from the liquid and passed to the deethanizer in a separate conduit; however, as vessel 24 may also be located a considerable distance from deethanizer 42 it is frequently advantageous to employ a common conduit for both the liquid and vapor.

Bottoms product comprising predominantly propane with whatever butanes are present in the overhead from the depropanizer is removed through line 48 and a vapor overhead stream predominantly ethane with a small amount of propane and whatever methane was present in the natural gasoline is removed through line 47. Deethanizing column 42 is likewise operated at an elevated pressure, for example, about 350 to 450 p.s.i.g.

When operating according to my invention and keeping the vapor separate from the condensate from accumulator 17 and combining this vapor with the vapor from the storage vessel 24 before compression thereof to the pressure of the deethanizing column, less overall vapor is formed than when the accumulator vapor is remixed with the condensate in line 23 then passed to the storage vessel 24 so that all of the vapor is removed through line 34.

Although the vapor streams 27 and 34 can be compressed separately, it should be understood that the advantage of my invention lies not in the recovery of vapor at a higher pressure so that less work of compression need be done on it because normally the vapor that is removed from the accumulator at the pressure of the depropanizer is reduced ultimately to the same pressure as that leaving the storage vessel. A combined vapor stream can be formed and this vapor stream is fed to a common compressor. The advantage of my invention is that less overall vapor is formed, thereby effectively increasing the capacity of the fractionation system.

To further illustrate my invention, the following examples are presented which demonstrate the operation of a natural gasoline fractionation system operating both with and without the benefit of my invention. The specific operating conditions given should be accepted as being typical and not interpreted as limiting my invention unduly.

EXAMPLE I

Natural gasoline is fed to a depropanizing column operated at about 300 p.s.i.g. The composition of the natural gasoline and the rate at which it is fed to the column are given in line 10 of Table I as mols per day. A bottoms product of gasoline boiling range hydrocarbons is removed through line 12 in the amount and composition as shown in Table I. The overhead product is passed through a condenser to form a mixture of vapor and condensate which is then passed to an accumulator held at 300 p.s.i.g. A portion of the condensate is pumped to the column for reflux and the remainder of the condensate is passed to a storage vessel which is maintained at 265 p.s.i.g. and 100° F. The amount and composition of the condensate passed to the storage vessel is shown in Table I as line 21. The amount of overhead vapors removed from the accumulator is shown in this table as line 27.

*Table I*

| Line[1] | Mols per Day | | | | | | | |
|---|---|---|---|---|---|---|---|---|
| | $C_1$ | $C_2$ | $C_3$ | $iC_4$ | $nC_4$ | $C_5$ | $C_6+$ | Total |
| 10 | 448 | 2,803 | 8,623 | 2,135 | 6,407 | 4,189 | 3,531 | 28,136 |
| 12 | | | 208 | 2,110 | 6,332 | 4,189 | 3,531 | 16,370 |
| 27 | 366 | 1,338 | 2,211 | 4 | 11 | | | 3,930 |
| 21 | 82 | 1,465 | 6,204 | 21 | 64 | | | 7,836 |

[1] Corresponds to numerals shown on drawing.

In a method of operation prior to my invention the overhead vapors in line 27 were passed through conduit 30 and combined with the liquid condensate in line 21 forming a stream in line 23 which is shown in Table II under the heading "Without Invention." The vapor is removed from the storage vessel 24 under these conditions through line 34 at a rate of 6,933 mols per day. The capacity of the compressor is 4,630 mols per day. Therefore, 2,303 mols per day must be vented through line 32. Liquid is removed from the storage vessel at a rate of 4,833 mols per day and the liquid and compressed vapors from line 46 are combined in line 41 forming a total stream of 9,463 mols per day fed to the deethanizer 42. The deethanizing column operates at 405 p.s.i.g. and 158° F. Under these conditions the overhead product is 2,616 mols per day, line 47, and bottoms product is 6,847 mols per day, line 48. The estimated maximum feed to the depropanizer under such conditions without any vapor loss through vent line 32 is 218,000 gallons per day.

*Table II*

[Without invention]

| Line[1] | Mols per Day | | | | | | | |
|---|---|---|---|---|---|---|---|---|
| | $C_1$ | $C_2$ | $C_3$ | $iC_4$ | $nC_4$ | $C_5$ | $C_6+$ | Total |
| 23 | 448 | 2,803 | 8,415 | 25 | 75 | | | 11,766 |
| 34 | 419 | 2,101 | 4,378 | 35 | | | | 6,933 |
| 32 | 139 | 698 | 1,454 | 12 | | | | 2,303 |
| 46 | 280 | 1,403 | 2,924 | 23 | | | | 4,630 |
| 39 | 29 | 702 | 4,037 | 65 | | | | 4,833 |
| 41 | 309 | 2,105 | 6,961 | 21 | 67 | | | 9,463 |
| 47 | 309 | 2,105 | 202 | | | | | 2,616 |
| 48 | | | 6,759 | 21 | 67 | | | 6,847 |

[1] Corresponds to numerals shown on drawing.

EXAMPLE II

Employing the process of my invention with the same natural gasoline feed to the depropanizer and the same conditions of temperature and pressure as given in Example I, the flow of condensate and vapor from accumulator 17 is likewise as given in Example I and shown in Table I. The stream flows through the remainder of the system are given in Table III under the heading "With Invention." By keeping the vapor separate in line 27 and passing it through line 31 to line 38, the vapor withdrawn from storage vessel 24 through line 34 amounts only to 679 mols per day. Thus the total compressed vapor stream in line 46 is only 4,609 mols per day. This is less than the compressor capacity so that no vapor need be vented through line 32. Flow of condensate through line 39 is thus 7,157 mols per day and the combined stream in line 41 is 11,766 mols per day which is 2,300 mols per day more than in the operation of Example I. Overhead and bottom streams from the deethanizer are given in Table III, lines 47 and 48. The estimated maximum feed to the depropanizer without any vapor loss through vent line 32 is 341,600 gallons per day. The maximum feed or the overall system when operating according to my invention is, therefore, approximately 124,000 gallons per day more than when all of the vapors are permitted to form in the storage tank 24.

*Table III*

[With invention]

| Line [1] | Mols per Day | | | | | | | |
|---|---|---|---|---|---|---|---|---|
| | $C_1$ | $C_2$ | $C_3$ | $iC_4$ | $nC_4$ | $C_5$ | $C_6+$ | Total |
| 34 | 40 | 223 | 414 | 1 | 1 | | | 679 |
| 46 | 406 | 1,561 | 2,625 | 5 | 12 | | | 4,609 |
| 39 | 42 | 1,242 | 5,790 | 20 | 63 | | | 7,157 |
| 41 | 448 | 2,803 | 8,415 | 25 | 75 | | | 11,766 |
| 47 | 448 | 2,803 | 281 | | | | | 3,532 |
| 48 | | | 8,134 | 25 | 75 | | | 8,234 |

[1] Corresponds to numerals shown on drawing.

As will be evident to those skilled in the art, various modifications of this invention can be made, or followed, in the light of the foregoing disclosure and discussion, without departing from the spirit or scope thereof.

I claim:

1. A process for fractionating raw natural gasoline which comprises (1) fractionally distilling said gasoline in a first depropanizing column to produce an overhead stream predominately ethane and propane, (2) condensing at least a portion of said overhead stream and accumulating the condensate in equilibrium with overhead stream vapors at a first elevated pressure in an accumulation zone, (3) returning a portion of said condensate to said first column as reflux and passing the remainder of said condensate to a storage zone at a second pressure substantially below said first pressure, (4) withdrawing vapors formed in said storage zone as a result of the pressure reduction and said vapors of said overhead stream from said accumulation zone, (5) combining said vapors from said storage zone and said accumulation zone, (6) compressing the vapors thus combined to a third pressure substantially above said second pressure, (7) passing said vapors thus compressed and condensate from said storage zone to a second deethanizing column as the principal feed thereto, (8) and fractionally distilling said feed in said second column to separate said ethane and propane.

2. The process of claim 1 wherein said first pressure is about 300 to 325 p.s.i.g., said second pressure is about 200 to 275 p.s.i.g., and said third pressure is about 350 to 450 p.s.i.g.

References Cited in the file of this patent

UNITED STATES PATENTS

| 1,803,581 | Woidich | May 5, 1931 |
| 2,301,520 | Carney | Nov. 10, 1942 |
| 2,324,112 | Rupp et al. | July 13, 1943 |
| 2,805,979 | Vermilion | Sept. 10, 1957 |

OTHER REFERENCES

Petroleum Refiner, vol. 28, No. 9, September 1949, pp. 213, 216, 217, 220, 221, 224, 225, 229, 232, 233, 236, 237 and 240.